UNITED STATES PATENT OFFICE.

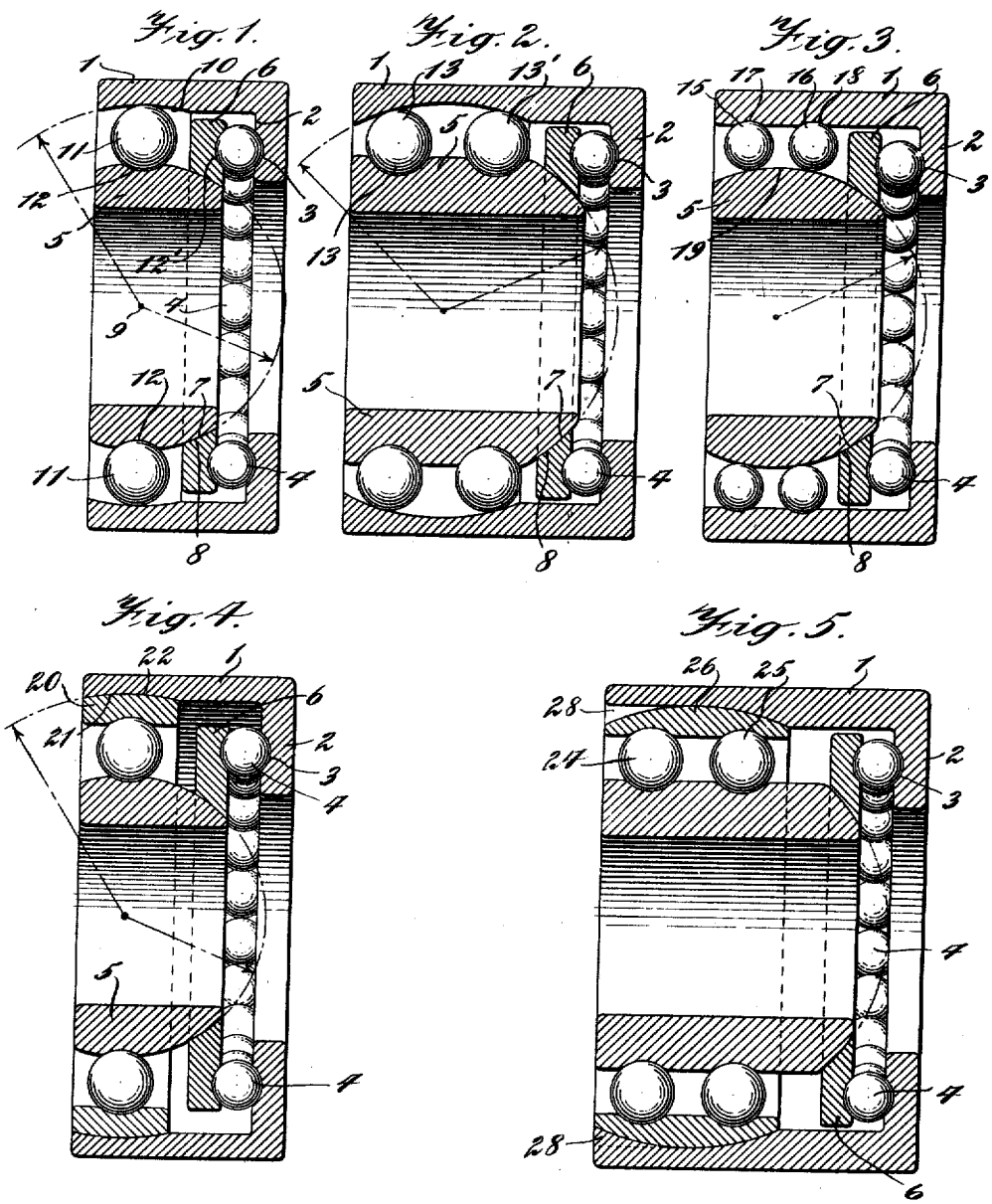

JOHN ERNEST PRUYN, OF PHILADELPHIA, PENNSYLVANIA.

BALL-BEARING.

1,319,794.  Specification of Letters Patent.  Patented Oct. 28, 1919.

Application filed October 4, 1917. Serial No. 194,667.

*To all whom it may concern:*

Be it known that I, JOHN ERNEST PRUYN, a citizen of the United States, residing at Philadelphia, in the county of Philadelphia and State of Pennsylvania, have invented certain new and useful Improvements in Ball-Bearings, of which the following is a full, clear, and exact description.

This invention relates to anti-friction bearings and more particularly to a bearing which is adapted to carry a radial load and also to take up the end-thrust of the member which carries the radial load.

In my application Serial No. 120,992, filed September 19, 1916, there is disclosed a bearing of this character which is self-adjusting; the parts of the bearing are so constructed and assembled that when the shaft or other member upon which the bearing is mounted has a movement which varies from its fixed axis of rotation, such a movement will be compensated for by a corresponding movement of parts of the bearing and the radial and end loads will be properly distributed under all conditions upon the anti-friction elements of the bearing.

The objects of the present invention are similar to those disclosed in the application referred to, namely, to provide a bearing of the character described which will be compact and will take up a minimum length of the shaft or other member to which it is secured; to provide a bearing which is composed of a few parts which can be readily assembled and when assembled can not be disassembled without removing the shaft or other member upon which the bearing is mounted, as well as other objects which will be apparent from the description which will hereinafter follow.

In the application before referred to and also in my application Serial No. 120,993, filed September 16, 1913, there are disclosed bearings of this character comprising an outer ring or housing having a spherical inner surface, which housing contains radial and end-thrust bearing rings and corresponding rows of radial and end-thrust anti-friction elements such as balls or rolls, the parts being arranged so that the radial and end-thrust bearing rings may have an angular movement within the housing about a common center, the end-thrust bearing ring having such movement by virtue of complementary spherical bearing surfaces upon the end-thrust ring and the housing. The construction of the present invention provides another way in which a bearing of a similar character may be made self-adjusting and instead of imparting to the end-thrust bearing ring an angular movement, this ring is adapted to rotate in a relatively fixed plane with respect to the housing, and the self-adjustment of the bearing is obtained by having contacting complementary spherical surfaces between the bearing and end-thrust ring instead of between the end-thrust ring and the outer ring or housing, which will permit the radial ring and radial anti-friction elements to adjust themselves to irregularities in the movement of the shaft or other member upon which the bearing is mounted, independently of the end-thrust bearing ring. In this form of construction, instead of interposing the end-thrust anti-friction elements between the radial and bearing rings, the anti-friction elements are interposed between the end-thrust bearing ring and the outer ring. The result of this change of construction is that the end-thrust bearing ring always rotates in a fixed plane with respect to the housing and the axes of rotation of the anti-friction elements will not be absolutely parallel to the axis of the shaft or other member upon which the bearing is mounted, when the direction of the axis of rotation of said shaft or member varies from its normal axis of rotation. However, the variation from parallelism between the axes of rotation of these parts will, under ordinary working conditions, be so slight that it will not materially affect the proper distribution of the load upon the end-thrust anti-friction elements.

In the accompanying drawings, there are disclosed several forms of bearings which differ from each other in details of construction but all embodying the same general principles, and it is intended that these modifications are to be interpreted as illustrative of and not as limiting the invention.

Figure 1 shows an axial section through one type of bearing embodying the features of the invention, and Figs. 2, 3, 4 and 5 show axial sections through bearings of slightly different constructions.

In the several constructions shown, the outer ring or housing 1 is of the same general construction, and in practice is adapted to be secured in the frame of a machine or other structure in which the bearing is to be used. This outer ring or housing is provided with an inwardly projecting part 2, which, in the forms disclosed, is positioned at one end of the housing, although not necessarily so, and provides a shoulder upon which is ground a raceway 3 for the anti-friction elements, which serves to carry the end-thrust. These anti-friction elements are shown as a row of balls 4, although rolls can be substituted therefor, if desired. Mounted within the outer ring or housing is a radial bearing ring 5 and an end-thrust bearing ring 6 having complementary spherical surfaces in contact with each other; in the preferred construction, one end of the radial bearing ring 5 is of convex curvature, as at 7, and the inner periphery of the end-thrust bearing ring 6 is concaved as at 8. The center of curvature of these surfaces is within the housing preferably at a point upon the axis of the bearing, the center being indicated at 9.

In the form of the invention shown in Fig. 1, the outer ring or housing 1 is provided with a suitable ground spherical inner surface 10 whose center of curvature is also at 9, so that it coincides with the center of curvature of the spherical surfaces 7 and 8. A row of balls 11 is interposed between the radial bearing ring 5 and the outer ring or housing 1, which balls roll upon a suitable raceway 12 formed upon the outer peripheral surface of the bearing ring and upon the spherical surface 10. A raceway 12' is also formed upon the surface of the end-thrust ring 6 adjacent the shoulder 2, so that the row of balls 4 is in rolling contact with this raceway and the raceway 3 formed upon the shoulder 2.

As before noted, the spherical surface 10 is ground so that its center of curvature is at 9. This center is arranged within the housing or outer ring 1, and the plane of the great circle of this sphere at right angles to the axis of the bearing, which is also the normal path of rolling contact of the balls with the surface 10, will therefore pass through the housing or outer ring 1 at some distance from the lefthand edge of the ring, as shown in Fig. 1. To each side of this great circle or the normal path of rolling contact the surface 10 curves downwardly so that the diameter of the surface 10 at the lefthand edge of the ring or housing 1 is less than the diameter at the normal path of rolling contact of the balls with the same, for which reason the balls carrying the radial load can not be forced from the outer ring or housing by an end-thrust on the bearing, unless they are tilted through a relatively wide arc, which is impossible without removing the shaft.

When a bearing, as described in Fig. 1, is mounted, as for example upon a shaft, which shaft has an oscillatory movement, the balls 11 and the radial ring 5 will move with the shaft but the balls 11 will always contact with the spherical surface 10 on a path which is one of the great circles of the spherical surface 10. In other words, the radial ring 5 has a universal movement with the outer ring 1, which will permit it to adjust itself to any oscillatory or other irregularities in the movement of the shaft or other member upon which the bearing is mounted. The amount of oscillation of a shaft from its normal axis of rotation is, in most machines, very slight, for which reason the width of the surface 10 may only be such as to provide for such movement, and it therefore may not be as wide as shown in Fig. 1. If, however, the bearing is to be used with a machine whose shaft has a wide oscillatory movement, then the width of this spherical surface may be increased so that at all times the path of rolling contact of the balls will be on a great circle of the spherical surface. During this movement of the radial ring 5 the end-thrust bearing ring 6 remains in a relatively fixed plane, which is perpendicular to the normal axis of the bearing. This is due to the fact that the balls 4 roll upon the ball race 3 upon the shoulder 2, and it is assumed that during this slight oscillatory or other movement of the shaft, the casing 1 has no corresponding movement. Since the complementary spherical surfaces 7 and 8 are in contact with each other the radial ring 5 may have the oscillatory movement ascribed to it independently of the ring 6.

The direction of the end-thrust carried by the ring 6 and the balls 4 will vary from absolute parallelism with the axes of rotation of the balls 4 when the shaft or other member carrying the ring 5 is oscillated, but the amount of variation is in practice very slight and the balls will properly distribute and carry the end-thrust load without undue wear upon any of them.

In Fig. 2 of the drawing, a construction similar to that of Fig. 1, is shown, but instead of utilizing only one row of radial balls 11, two rows are shown, which have been indicated 13 and 13'. The end-thrust bearing ring and end-thrust balls are similar to that disclosed in Fig. 1.

In Fig. 3, two rows of radial ball bearings 15 and 16 have been shown, which engage suitable raceways 17 and 18 formed upon the inner peripheral surface of the outer ring or housing 1, which instead of being spherical is cylindrical in shape. The raceways 17 and 18 are similar to those in an ordinary ball bearing, being merely grooves formed in the cylindrical surface. The radial ring 5, however, is provided with a spherical surface 19 which has the same function as the spherical surface 10 shown in Figs. 1 and 2; that is, it permits the radial ring 5 to have an oscillatory movement with the shaft or member which passes therethrough, independently of the outer ring or housing 1. It will be noted that in both Figs. 2 and 3 the points of rolling contact of the balls with the outer ring and radial bearing ring respectively, do not lie in a plane perpendicular to the normal axis of the shaft which passes through the radial bearing ring 5. However, in practice this is believed to be immaterial if the points of rolling contact are not too far out of alinement.

In the form shown in Fig. 4, instead of having the balls 11 roll directly upon a spherical surface 10 formed upon the housing or outer ring 1, a hardened ring 20 is interposed. This ring has a convex outer spherical surface 21 which engages a complementary concave spherical surface 22 formed upon the inner peripheral surface of the outer ring, the center of curvature of both surfaces being at 9. The ring 20 will therefore have a universal movement within the outer ring or housing 1 which will permit the radial bearing ring 5 to adjust itself in the same manner as it can adjust itself in Fig. 1.

The construction shown in Fig. 5 is in all respects similar to that disclosed in Fig. 4, with the exception that a double row of balls 24 and 25 are utilized to carry the radial load, which balls ride on a ring 26.

In Fig. 5 cut-outs 28 are provided which will permit the ring 26 to be swung into position at right angles to its present position for the purpose of assembling. The other forms can be readily assembled by properly positioning the parts.

Various other modifications of the invention may be made without departing from the spirit of the invention, the scope of which is set forth in the appended claims.

I claim:

1. A bearing of the class described comprising a housing, a radial bearing ring and a thrust bearing ring in said housing, anti-friction elements interposed between said housing and each of said rings, said radial ring and its anti-friction elements having a universal movement in said housing, and said rings having contacting complementary spherical surfaces.

2. A bearing of the class described comprising a housing, a radial bearing ring in said housing, anti-friction elements interposed between said housing and said ring, said ring having a universal movement in said housing, a thrust bearing ring in said housing, anti-friction elements interposed between said thrust ring and said housing, and said thrust ring having a fixed plane of rotation with respect to said housing.

3. A bearing of the class described comprising a housing, a radial bearing ring in said housing, anti-friction elements interposed between said ring and said housing, said ring and anti-friction elements having a universal movement in said housing, a thrust bearing ring in said housing, anti-friction elements interposed between said ring and said housing, said radial ring being operatively associated with said thrust ring to impart the thrust load thereto, and said radial ring having an independent movement with respect to said thrust ring.

4. A bearing of the class described comprising a housing, a radial bearing ring in said housing mounted for universal movement therein and adapted to receive the radial and thrust loads, anti-friction elements interposed between said housing and said ring for sustaining the radial load, an end-thrust bearing ring and anti-friction elements supported between said end thrust ring and said housing for sustaining the thrust load.

5. A bearing of the class described comprising a housing, a radial bearing ring, anti-friction elements interposed between said ring and said housing, said ring and elements having a universal movement in said housing about a fixed center, an end-thrust bearing ring in said housing, anti-friction elements interposed between said housing and said ring, said rings having contacting complementary spherical surfaces whose center of curvature is coincident with said fixed center.

6. A bearing of the class described comprising a housing having a shoulder formed thereon, an end-thrust ring in said housing, anti-friction elements interposed between said thrust ring and said shoulder, said anti-friction elements having their axis of rotation substantially parallel to the axis of the housing, a radial bearing ring in said housing, anti-friction elements interposed between said radial ring and said housing, said radial ring and its elements having a universal movement in said housing independent of said thrust-bearing ring and its anti-friction elements.

7. A bearing of the class described comprising a housing, a radial bearing ring in said housing, one of said parts having a surface of spherical curvature whose center of curvature lies within said housing, anti-friction elements interposed between said ring and said housing, an end-thrust bearing ring in said housing, anti-friction elements interposed between said end thrust bearing ring and said housing, said rings having contacting complementary spherical surfaces having their center of curvatures coincident with the center of curvature of said first named spherical surface.

8. A bearing of the class described comprising a housing, a radical bearing ring in said housing, one of said parts having a surface of spherical curvature, anti-friction elements interposed between said ring and said housing, a thrust bearing ring in said housing, anti-friction elements interposed between said thrust bearing ring and said housing, said radial bearing ring having a movement in said housing independent of said end-thrust bearing ring.

9. A bearing of the class described comprising a housing having a spherical inner surface, an end-thrust bearing ring and a radial bearing ring within said housing, anti-friction elements interposed between said radial ring and said housing, other anti-friction elements interposed between said end-thrust bearing ring and said housing, said rings having contacting surfaces of spherical curvature.

10. A bearing of the class described comprising a housing of restricted diameter at one end and having a spherical inner surface, an end-thrust bearing ring in said housing, anti-friction elements interposed between said ring and the contracted portion of said housing, a radial bearing ring in said housing, anti-friction elements interposed between said radial ring and said housing, said radial ring and said housing having surfaces permitting universal movement of said radial ring within said housing, said radial ring engaging with, but having a movement independent of said end-thrust ring.

In witness whereof, I subscribe my signature, in the presence of two witnesses.

JOHN ERNEST PRUYN.

Witnesses:
VINCENT D. OLIVET,
JAS. GRIBBIN.

Copies of this patent may be obtained for five cents each, by addressing the "Commissioner of Patents, Washington, D. C."